UNITED STATES PATENT OFFICE.

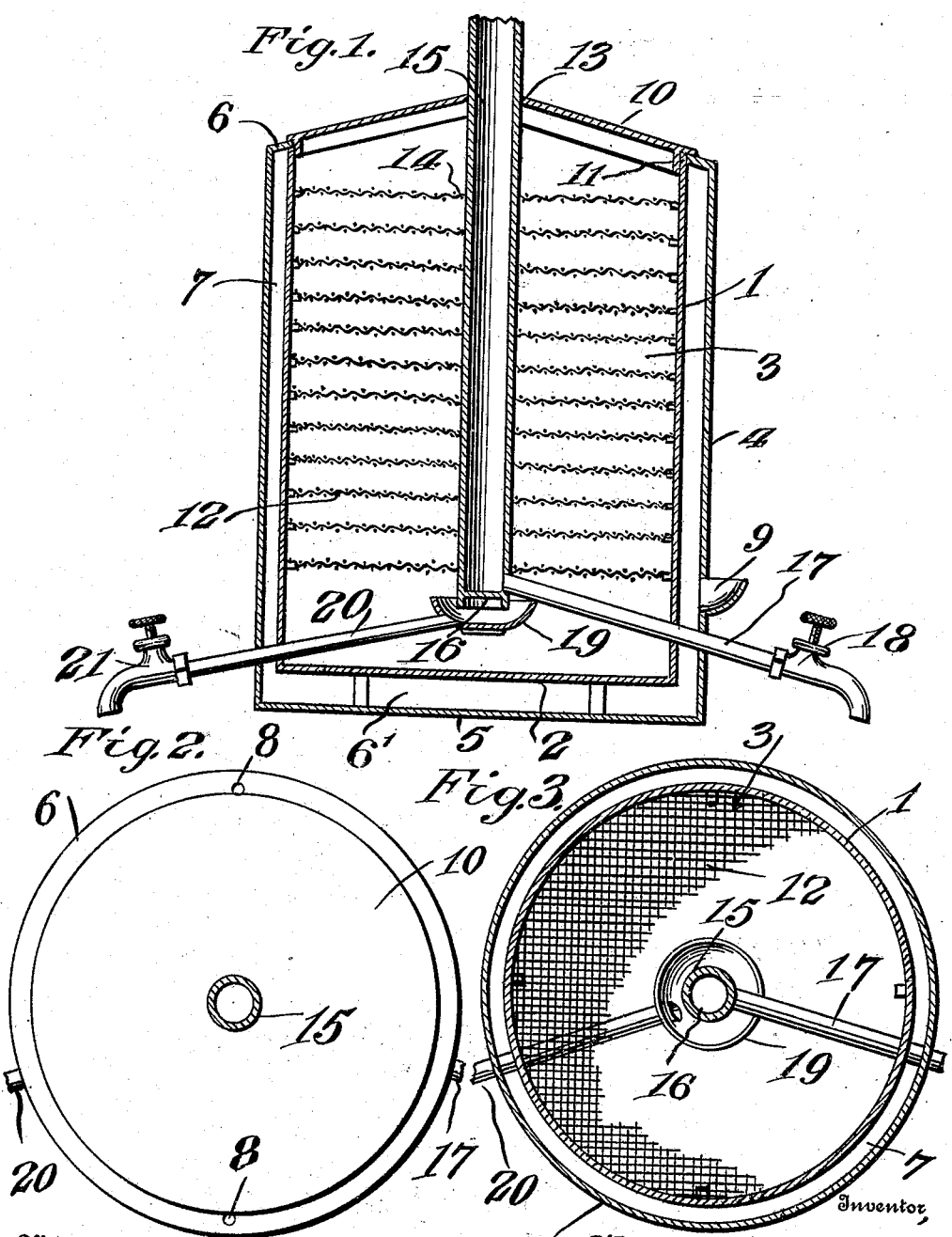

CHARLES O. LEE, OF MODESTO, CALIFORNIA.

FRUIT-EVAPORATOR.

No. 924,476.

Specification of Letters Patent.

Patented June 8, 1909.

Application filed July 28, 1908. Serial No. 445,810.

*To all whom it may concern:*

Be it known that I, CHARLES O. LEE, a citizen of the United States, residing at Modesto, in the county of Stanislaus and State of California, have invented new and useful Improvements in Fruit - Evaporators, of which the following is a specification.

This invention relates to improvements in fruit evaporators, the object of the invention being to provide a simple, efficient and inexpensive type of evaporator for family use and for the use of small fruit growers by which fruit may be conveniently and rapidly evaporated.

The invention consists of the features of construction, combination and arrangement of parts hereinafter fully described and claimed, reference being had to the accompanying drawing, in which:—

Figure 1 is a vertical sectional view of a fruit evaporator embodying my invention. Fig. 2 is a top plan view of the same. Fig. 3 is a horizontal section.

Referring to the drawing, my improved fruit evaporator comprises an inner vessel 1 open at the top and having a closed bottom 2, the interior of the vessel constituting an evaporating chamber 3. Inclosing said inner vessel is an outer vessel or jacket 4 provided with a closed bottom 5 and having at its upper end a flange 6 extending inwardly and bearing against the upper end of the vessel 1. The two vessels are of proper diameter and concentrically arranged to provide a lower intervening boiler chamber 6' and an upper steam space 7 surrounding the chamber 3, which space is closed at its upper end by the flange 6 in which are formed one or more steam vents or openings 8. The vessel 4 is provided at one side with a water inlet 9 through which the water may be supplied to the boiler chamber 6', which is designed to be filled to the level of the bottom of the inlet. A conical cover 10 is provided to rest upon the flange 6 and upper edge of the vessel 1 and is provided with a depending flange 11 to enter said vessel, so as to tightly close the chamber 3. It will be understood, of course, that the body of the apparatus as thus constructed may be of any approved form and size, and that the inner vessel may be supported within the outer vessel in any suitable manner.

The wall of the chamber 3 is provided with suitable ledges to support a series of perforate fruit trays 12, which may be made of foraminous sheet metal, but are preferably composed of wire stiffened or strengthened as occasion may require. These trays are flexible enough to be marginally bent to clear the ledges on their insertion and removal and designed to support the fruit to be evaporated and are removable through the open top of the vessel 1. The cover 10 is provided with a central opening 13 and the trays with corresponding openings 14 for the passage of a tube or pipe 15, which extends down into the evaporating chamber 3 to a point below the lowermost tray and above the bottom 2. The tube is provided with a closed lower end 16 and has extending from the lower end thereof a pipe 17 leading outward through one side of the apparatus and provided with a faucet 18. Disposed below the closed end of the tube is a cup or basin 19, from which extends a pipe 20 leading to the exterior through the opposite side of the apparatus from the pipe 17 and provided at its outer end with a valve or faucet 21.

In operation, the fruit to be evaporated is arranged upon the trays which are placed within the evaporating chamber 3, which is then closed by the removable cover 10, and water is admitted through the inlet 9 into the boiler chamber 6' until the latter is filled to the desired level. The water in the boiler chamber is then heated in any preferred manner, as by placing the apparatus upon a stove or above one or more burners, and steam is thus generated which fills the space 7 and heats the chamber 3, thus driving off the moisture from the fruit, the steam gradually escaping from the chamber through the vents 8, whereby overgeneration of steam is prevented. As soon as the generation of steam begins, the tube or pipe 15 is filled with cold water, by which the wall of the pipe is maintained at a low temperature, and the moisture from the fruit coming in contact therewith is condensed, the water of condensation flowing down the exterior of the tube and dripping into the cup or basin 19, from which it flows into the pipe 20, from which it may be drawn off at desired intervals by opening the valve or faucet 21. The tube or pipe 15 may be replenished at intervals with cold water to maintain it at the desired low temperature and the warmed water therein drawn off through the pipe 17 by opening the faucet 18, or, if desired, the faucet may be allowed to remain partly open and cold water allowed to circulate slowly and continuously through the tube. This operation of condensing the moisture driven off from the fruit results in the evaporation of the latter in a thorough and effective manner within a comparatively short period, and after the evaporation of one charge the trays may be removed and replaced with a fresh charge of fruit to be evaporated. It will be apparent that the operation may be readily carried out in any ordinary household, and therefore may be inexpensively performed, and as the construction of the evaporator is simple it may be manufactured and sold at a low cost, so that it may be placed within the reach of families and small fruit growers.

Having thus fully described the invention, what is claimed as new is:—

1. A fruit evaporator comprising an evaporating chamber, means for heating the same to evaporate the moisture from the fruit contained therein, a drip cup disposed in the bottom of said chamber, a series of superposed trays within the chamber above said cup, a water conducting tube entering the chamber and extending downward through the trays and having a closed end terminating above the cup, said tube forming a condenser, an outlet pipe leading exteriorly from the lower end of the tube, and a drip conductor leading outwardly from the cup.

2. A fruit evaporator comprising an inner vessel forming an evaporating chamber, an outer vessel spaced therefrom and forming a boiler and steam space about the chamber to heat the same and evaporate the moisture from the fruit therein, a drip cup disposed in the bottom of said chamber, a series of superposed trays within the chamber above said cup, a water conducting tube entering the chamber and extending downward through the trays and having a closed end terminating above the cup, said tube forming a condenser, an outlet pipe leading exteriorly from the lower end of the tube, and a drip conductor leading outwardly from the cup.

3. A fruit evaporator comprising an evaporating chamber, means for heating the same to evaporate the moisture from the fruit contained therein, a drip cup disposed in the bottom of said chamber, a water conducting tube entering the chamber and having a closed end terminating above the cup, said tube forming a condenser, and an outlet pipe leading externally from the lower end of said tube.

4. A fruit evaporator comprising an inner vessel forming an evaporating chamber, an outer vessel disposed in spaced relation thereto to form a basal boiler chamber and a superposed steam space, whereby said chamber may be heated to evaporate the moisture from the fruit therein, said outer casing also being provided with a filling inlet and a steam vent, a collecting cup disposed in the bottom of the evaporating chamber and having a valved discharge pipe leading exteriorly therefrom, a condensing tube extending downwardly into the chamber and having a closed end terminating above said cup, and a valved outlet pipe leading exteriorly from the lower end of said tube.

In testimony whereof I affix my signature in presence of two witnesses.

CHARLES O. LEE.

Witnesses:
J. W. Ross,
Geo. Perley.